US011325998B2

(12) United States Patent
Lee et al.

(10) Patent No.: US 11,325,998 B2
(45) Date of Patent: May 10, 2022

(54) METHOD FOR PREPARING VINYL CHLORIDE-BASED POLYMER AND VINYL CHLORIDE-BASED POLYMER PREPARED THEREFROM

(71) Applicant: LG CHEM, LTD., Seoul (KR)

(72) Inventors: Se Woong Lee, Daejeon (KR); Seong Yong Ahn, Daejeon (KR); Kun Ji Kim, Daejeon (KR); Hyun Kyou Ha, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 16/768,482

(22) PCT Filed: Dec. 19, 2018

(86) PCT No.: PCT/KR2018/016224
§ 371 (c)(1),
(2) Date: May 29, 2020

(87) PCT Pub. No.: WO2019/124967
PCT Pub. Date: Jun. 27, 2019

(65) Prior Publication Data
US 2021/0171674 A1 Jun. 10, 2021

(30) Foreign Application Priority Data
Dec. 19, 2017 (KR) .......................... 10-2017-0175312

(51) Int. Cl.
*C08F 14/06* (2006.01)
*C08L 27/06* (2006.01)
*C08L 29/04* (2006.01)

(52) U.S. Cl.
CPC .............. *C08F 14/06* (2013.01); *C08L 27/06* (2013.01); *C08L 29/04* (2013.01); *C08L 2205/025* (2013.01); *C08L 2205/035* (2013.01)

(58) Field of Classification Search
None
See application file for complete search history.

(56) References Cited

U.S. PATENT DOCUMENTS

| 5,089,575 A | 2/1992 | Arima et al. |
| 5,883,209 A | 3/1999 | Nakano et al. |
| 10,889,668 B2* | 1/2021 | Jeon .......................... C08F 2/20 |
| 2016/0046800 A1 | 2/2016 | Lee |
| 2018/0244815 A1 | 8/2018 | Jeon et al. |

FOREIGN PATENT DOCUMENTS

| EP | 3321294 A1 | 5/2018 |
| JP | H06329709 A | 11/1994 |
| JP | H0826101 B2 | 3/1996 |
| JP | H09110907 A | 4/1997 |
| JP | 2000-103803 | 4/2000 |
| JP | 2006321946 A | 11/2006 |
| KR | 1996-0016621 B1 | 12/1996 |
| KR | 2000-0055793 A | 9/2000 |
| KR | 10-2006-0038100 A | 5/2006 |
| KR | 10-2012-0110245 A | 10/2012 |
| KR | 10-1417941 B1 | 7/2014 |
| KR | 10-2015-0026543 A | 3/2015 |
| KR | 10-2015-0037050 A | 4/2015 |
| KR | 10-2016-0133831 A | 11/2016 |
| KR | 10-2017-0124959 | 11/2017 |
| KR | 1020190046326 A * | 5/2019 |
| WO | 2017-191899 | 11/2017 |

OTHER PUBLICATIONS

Nilsson et al., "Suspension Stabilizers for PVC Production III: Control of Resin Porosity," Journal of Vinyl Technology 7(3): 123-127 (1985).
Abstract and excerpt of Stephen Ormondroyd, "Effect of Polyvinyl Alcohol Dispersant on the Structure of Suspended Polyvinyl Chloride Particles", Polyvinyl Chloride, 1989, issue 6, pp. 45-51 (7 Pages).

* cited by examiner

*Primary Examiner* — Richard A Huhn
(74) *Attorney, Agent, or Firm* — Dentons US LLP

(57) ABSTRACT

The present invention relates to a method for preparing a vinyl chloride-based polymer, more specifically, to a method for preparing a vinyl chloride-based polymer through which it is possible to improve an apparent specific gravity of a vinyl chloride-based polymer to be prepared by controlling a surface tension of a polymerization mixture to 46.5 mN/m or more, and thus, to improve an extrusion amount when extruded, whereby a vinyl chloride-based polymer having excellent processing productivity can be prepared.

9 Claims, No Drawings

METHOD FOR PREPARING VINYL CHLORIDE-BASED POLYMER AND VINYL CHLORIDE-BASED POLYMER PREPARED THEREFROM

The present application is a National Phase Entry pursuant to 35 U.S.C. § 371 of International Application No. PCT/KR2018/016224 filed Dec. 19, 2018, and claims priority to and the benefit of Korean Patent Application No. 10-2017-0175312, filed on Dec. 19, 2017, in the Korean Intellectual Property Office, the disclosures of which are incorporated herein in their entirety by reference.

FIELD

The present invention relates to a method for preparing a vinyl chloride-based polymer and a vinyl chloride-based polymer prepared therefrom.

BACKGROUND

Generally, a vinyl chloride-based polymer is a polymer containing 50% or more vinyl chloride, and vinyl chloride-based polymer is inexpensive, has hardness which can be easily controlled, is applicable to most processing equipment, and has various application fields. In addition, the vinyl chloride-based polymer has excellent physical and chemical properties such as mechanical strength, weather resistance, chemical resistance, and thus is a universal resin widely used around the world in living and industrial materials such as films, sheets, molded articles, and is also widely used in various applications such as building materials, daily commodities, interior materials for vehicles, and decoration materials.

Accordingly, studies for improving productivity of vinyl chloride resin have been developed conventionally, and, for example, in Korean Patent Laid-Open Publication No. 2006-0038100, various methods such as providing a method for separately introducing monomers two or more times to improve productivity have been proposed.

Particularly, soft vinyl chloride resin is used for films, sheet wires, etc., and rigid vinyl chloride resin is widely used for pipes, sashes, etc. by adding various additives as disclosed in Korean Patent Registration No. 1417941.

Meanwhile, when the apparent specific gravity of rigid vinyl chloride resin is low, the load weight per volume is small, so that there are problems that transportation is difficult, and excessive transportation costs are incurred. A vinyl chloride resin is typically supplied to an extruder on a volume basis when extruded, so that when the apparent specific gravity is low, the weight per unit volume is decreased and thus an amount of extrusion is reduced, which results in a problem of poor processing productivity. Accordingly, there is a need for studies to improve the apparent specific gravity of the vinyl chloride resin so as to improve processing productivity and to ease transportation in the preparation of the hard vinyl chloride resin.

PRIOR ART DOCUMENTS (Patent Document 1) KR 2006-0038100 A (May 3, 2006).
(Patent Document 2) KR 1417941 B1 (Jul. 3, 2014).

SUMMARY

The present invention has been made to solve the problems of the prior art, and an aspect of the present invention provides a method for preparing a vinyl chloride-based polymer in which surface tension of a polymerization mixture is controlled to a predetermined level or higher during suspension polymerization of the vinyl chloride-based polymer.

In addition, the present invention also provides a method for preparing a vinyl chloride-based polymer through which a vinyl chloride-based polymer having a high apparent specific gravity and an excellent extrusion amount can be prepared when extruded.

According to certain aspects of the present invention, there is provided a method for preparing a vinyl chloride-based polymer, the method comprising a step of suspension polymerization of a vinyl chloride-based monomer in the presence of a polymerization mixture to prepare a vinyl chloride-based polymer, wherein the polymerization mixture contains polymerization water, a polymerization initiator, and a protective colloid auxiliary agent, and the polymerization mixture has a surface tension of 46.5 mN/m or more.

In a method for preparing a vinyl chloride-based polymer according to an embodiment of the present invention, there is an effect of improving an apparent specific gravity of a vinyl chloride-based polymer to be prepared by controlling a surface tension of a polymerization mixture to 46.5 mN/m or more, and it is possible to improve an extrusion amount when molded articles formed of a rigid vinyl chloride-based polymer are manufactured, whereby processing productivity thereof is excellent.

DETAILED DESCRIPTION

Hereinafter, the present invention will be described in more detail to help understanding of the present invention. It will be understood that the words or terms should be interpreted as having a meaning that is consistent with their meaning in the context of the relevant art and the technical idea of the invention, based on the principle that an inventor may properly define the meaning of the words or terms to best explain the invention.

The present invention provides a method for preparing a vinyl chloride-based polymer through which it is possible to prepare a vinyl chloride-based polymer having a high apparent specific gravity and an excellent extrusion amount when extruded.

The method for preparing a vinyl chloride-based polymer according to an embodiment of the present invention includes a step of suspension polymerization of a vinyl chloride-based monomer in the presence of a polymerization mixture to prepare a vinyl chloride-based polymer, wherein the polymerization mixture contains polymerization water, a polymerization initiator, and a protective colloid auxiliary agent, and the polymerization mixture has a surface tension of 46.5 mN/m or more.

In the present invention, "vinyl chloride-based polymer" comprehensively represents a compound prepared by polymerizing vinyl chloride-based monomers, and may mean a polymer chain derived from a vinyl chloride-based monomer.

In the description, vinyl chloride monomer may mean a vinyl chloride monomer alone or a monomer mixture in which a vinyl chloride monomer and a vinyl-based monomer, which is copolymerizable with the vinyl chloride monomer, are mixed.

In the present invention, the "polymerization mixture" comprehensively represents reaction auxiliary agents present in a reactor prior to initiation of a polymerization reaction, and may mean the vinyl chloride-based monomer is excluded therefrom. For example, the polymerization mixture may mean a mixture of at least one of a polymerization initiator, a protective colloid auxiliary agent, polymerization water, and various additives, and the polymerization mixture may be present in a solution form, wherein surface tension of the polymerization mixture may mean surface tension of the polymerization mixture solution, that is, surface tension of the polymerization mixture.

Specifically, the surface tension of the polymerization mixture of the present invention may be 46.5 mN/m or more, preferably 46.5-50 mN/m, more preferably 46.5-48 mN/m.

When the surface tension of the polymerization mixture is less than 46.5 mN/m, an interfacial tension between the polymerization mixture and the vinyl chloride-based monomer is too small that the droplets cannot maintain stability, thereby causing active breakage and aggregation, and the formation of a vinyl chloride-based polymer having excessively developed internal voids. As a result, the volume including the internal voids increases greatly, and there may be a problem that the apparent specific gravity is lowered, wherein if the apparent specific gravity is lowered, the small amount of the vinyl chloride-based polymer, relative to the volume thereof, is supplied when supplying the vinyl chloride-based polymer to an extruder, whereby the extrusion product amount may be reduced. Also, a large amount of energy may be consumed to meet a temperature for processing in the extruder, so that the entire processing productivity may be lowered.

In the description, the surface tension may be a value obtained by measuring the surface tension of a 0.2% aqueous solution using a Du-Nouy surface tension meter under the conditions of a temperature of 25° C. and atmospheric pressure, specifically, a pressure of 1 atm. Specifically, the surface tension value may be obtained by measuring a momentary force when a platinum ring horizontally contacting the solution surface is removed therefrom, and substituting a radius and a correction term of the platinum ring.

In the description, the "apparent specific gravity" may mean a specific gravity per volume including all the internal voids present in the vinyl chloride-based polymer.

According to an embodiment of the present invention, the polymerization mixture may include polymerization water, a polymerization initiator, and a protective colloid auxiliary agent, and in addition to the same, may further optionally include at least one of various additives which can be added when preparing the polymer.

The protective colloid auxiliary agent may be used for maintaining stability of the vinyl chloride-based monomer in the process of preparing the vinyl chloride-based polymer, and for obtaining properties of the vinyl chloride-based monomer at a desired degree, such as plasticizer absorptivity (CPA), an average particle diameter, apparent specific gravity, and particle size distribution. Specifically, the protective colloid auxiliary agent may be at least one selected from the group consisting of: (i) a vinyl alcohol-based resin of which a hydrolysis degree is 30-98% and viscosity of 4% aqueous solution at room temperature is 5-100 cps; (ii) a cellulose-based material in which a content of a methoxy group is 15-40 wt % and a content of a hydroxypropyl group is 3-20 wt %; and (iii) an unsaturated organic acid, and preferably a vinyl alcohol-based resin of which a hydrolysis degree is 30-98% and viscosity of 4% aqueous solution at room temperature is 5-100 cps; (iv) a cellulose-based material in which a content of a methoxy group is 15-40 wt % and a content of a hydroxypropyl group is 3-20 wt %; or a mixture thereof. At the time, the unit % of the hydrolysis degree may also be interpreted as wt %.

The protective colloid auxiliary agent may be included in an amount of 0.02-5 parts by weight, preferably 0.05-2.5 parts by weight, more preferably 0.05-1.5 parts by weight, with respect to 100 parts by weight of the vinyl chloride-based monomer. When the amount of the protective colloid auxiliary agent used is 0.02-5 parts by weight, the stability of the droplets is improved, so that breakage and aggregation of the particles are suitably controlled when preparing the vinyl chloride-based polymer, and as a result, a vinyl chloride-based polymer including preferable internal voids may be prepared.

Meanwhile, the protective colloid auxiliary agent may include a vinyl alcohol-based resin and a cellulose-based material, and at the time, when the hydrolysis degree of the vinyl alcohol-based resin is 30-98% and the surface tension of the entire polymerization mixture is 46.5 mN/m or more, the kind of the vinyl alcohol-based resin is not limited, but may include, for example, a mixture of two or more vinyl alcohol-based resins having the different surface tensions. Specifically, the vinyl alcohol-based resin may include a vinyl alcohol-based resin having a surface tension of more than 48 mN/m and a vinyl alcohol-based resin having a surface tension of 42-48 mN/m, preferably a vinyl alcohol-based resin having a surface tension of more than 48 mN/m and a vinyl alcohol-based resin having a surface tension of 42-45 mN/m.

In addition, the vinyl alcohol-based resin may include a mixture of two or more vinyl alcohol-based resins having the different hydrolysis degrees, and for example, may include a vinyl alcohol-based resin having a hydrolysis degree of more than 60% to 90% or less (a high-hydrolysis resin) and a vinyl alcohol-based resin having a hydrolysis degree of 30-60% (a low-hydrolysis resin). More specifically, for example, the vinyl alcohol-based resin mixture may include a mixture of at least two or more of a vinyl alcohol-based resins having a hydrolysis degree of more than 75% to 98% or less (a high-hydrolysis resin), a vinyl alcohol-based resin having a hydrolysis degree of more than 60% to 75% or less (a middle-hydrolysis resin), and a vinyl alcohol-based resin having a hydrolysis degree of 30-60% (a low-hydrolysis resin), wherein the vinyl alcohol-based resin may have a different surface tension depending on the hydrolysis degree. Specifically, a vinyl alcohol-based resin having a relatively high hydrolysis degree may have a relatively high surface tension, and the vinyl alcohol-based resin having a relatively low hydrolysis degree may have a relatively low surface tension.

For example, the protective colloid auxiliary agent according to an embodiment of the present invention may include mixture of at least two or more of: a vinyl alcohol-based resin having a hydrolysis degree of more than 75% to 98% or less and a surface tension of more than 48 mN/m; a vinyl alcohol-based resin having a hydrolysis degree of more than 60% to 75% or less and a surface tension of 42-48 mN/m, preferably 42-45 mN/m; and a vinyl alcohol-based resin having a hydrolysis degree of 30-60% and a surface tension of 42-48 mN/m, preferably 42-45 mN/m.

The content of each of the vinyl alcohol-based resins may be, with respect to 100 parts by weight of the vinyl chloride-based monomer, 0.01-0.1 parts by weight of the vinyl alcohol-based resin having a hydrolysis degree of more than 75% to 98% or less, 0.01-0.06 parts by weight of the vinyl alcohol-based resin having a hydrolysis degree of more than 60% to 75%, and 0.005-0.05 parts by weight of the vinyl alcohol-based resin having a hydrolysis degree of 30-60%.

Specifically, in the protective colloid auxiliary agent according to an embodiment of the present invention, the vinyl alcohol-based resin, with respect to 100 parts by weight of the vinyl chloride-based monomer, may include a mixture of at least two or more of: 0.01-0.1 parts by weight of a vinyl alcohol-based resin having a hydrolysis degree of more than 75% to 98% or less and a surface tension of more than 48 mN/m; 0.01-0.06 parts by weight of a vinyl alcohol-based resin having a hydrolysis degree of more than 60% to 75% and a surface tension of 42-48 mN/m, preferably 42-45 mN/m; and 0.005-0.05 parts by weight of a vinyl alcohol-based resin having a hydrolysis degree of 30-60% and a surface tension of 42-48 mN/m, preferably 42-45 mN/m.

Furthermore, in the protective colloid auxiliary agent, the cellulose-based material may be included in an amount of 0.001-0.5 parts by weight, more preferably 0.001-0.01 parts by weight, with respect to 100 parts by weight of the vinyl chloride-based monomer. Examples of the cellulose-based material may be methylcellulose, hydroxyethylcellulose, hydroxypropylcellulose, hydroxypropylmethylcellulose, or the like, and a mixture of any two or more thereof may also be used. Among them, hydroxypropylmethylcellulose is preferable, and the cellulose-based material may have, more specifically, a methoxy group of 15-40 wt % and a hydroxypropyl group of 3 to 20 wt %, and a viscosity of 2% aqueous solution measured at 20° C. may be 10-20,000 cps.

Meanwhile, the cellulose-based material is not particularly limited as long as included at the described amount ratio with respect to 100 parts by weight of the vinyl chloride-based monomer, but may preferably be included in an amount of 30 wt % or less, more preferably 15 wt % or less, even more preferably 10 wt % or less.

In addition, the protective colloid auxiliary agent may further include an unsaturated organic acid polymer, and examples of the unsaturated organic acid polymer may be an acrylic acid polymer, a methacrylic acid polymer, an itaconic acid polymer, a fumaric acid polymer, a maleic acid polymer, a succinic acid polymer, or the like, and a mixture of any two or more thereof may also be used.

Suspension polymerization according to an embodiment of the present invention may be performed at the polymerization temperature of the vinyl chloride polymer in the conventional suspension polymerization, and when the temperature is lowered, a number average polymerization degree of the vinyl chloride polymer is increased and when the temperature is raised, a number average polymerization degree of the vinyl chloride polymer is decreased. In one example of the present invention, the suspension polymerization may be performed at a temperature of 30-80° C., preferably 50-70° C.

Particularly, it is preferable that the suspension polymerization is performed in the reactor of which the internal temperature is higher than the conventional polymerization initiation temperature, particularly, 2-5° C. higher than the polymerization initiation temperature when the polymerization initiator is added, and as a result, there is an effect that an initial decomposition rate of the initiator is improved.

According to an embodiment of the present invention, the polymerization water is a polymerization solvent, and various kinds of polymerization water such as distilled water or deionized water may be used, preferably deionized water may be used. A temperature of the polymerization water may be appropriately selected in consideration of the temperature at which the suspension polymerization is performed. The amount of polymerization water may be appropriately selected according to the polymerization conditions, and for example, may be used in an amount of 70 parts by weight or more, specifically in an amount of 70-140 parts by weight with respect to 100 parts by weight of the vinyl chloride-based monomer.

Furthermore, the polymerization initiator may be used in an amount of 0.02-0.2 parts by weight with respect to 100 parts by weight of the vinyl chloride-based monomer used for the polymerization. Specifically, the polymerization initiator may be used in an amount of 0.03-0.12 parts by weight with respect to 100 parts by weight of the vinyl chloride-based monomer. When the amount of the polymerization initiator is less than 0.02 parts by weight, polymerization reaction time may become longer and conversion rate to the vinyl chloride-based polymer may be lowered, thereby deteriorating the productivity. When the amount of the polymerization initiator exceeds 0.2 parts by weight, the polymerization initiator cannot be consumed completely during the polymerization and is remained in the vinyl chloride-based polymer finally prepared, thereby deteriorating the physical properties, particularly the thermal stability, of the polymer.

The polymerization initiator is not particularly limited, but may be, for example, diacylperoxides such as dicumylperoxide, dipentylperoxide, di-3,5,5-trimethylhexanoylperoxide, and dilauroylperoxide;

peroxydicarbonates such as diisopropylperoxydicarbonate, di-sec-butylperoxydicarbonate, di-2-ethylhexylperoxydicarbonate, and cumylperoxydicarbonate; peroxy esters such as t-butylperoxy neodecanoate, t-butylperoxy neoheptanoate, t-amylperoxy neodecanoate, cumyl peroxyneodecanoate, cumyl peroxyneoheptanoate, and 1,1,3,3-tetramethylbutyl peroxyneodecanoate; an azo compound such as azobis-2,4-dimethylvaleronitrile; and sulfates such as potassium persulfate and ammonium persulfate, and the examples may be used alone or in a combination of two or more thereof. Preferably, di-2-ethylhexylperoxydicarbonate, cumylperoxydicarbonate, t-butylperoxy neodecanoate, or a mixture thereof, may be used.

A method for preparing a vinyl chloride-based polymer according to an embodiment of the present invention may include stirring the reaction mixture prepared above, and suspension polymerization may be performed through the stirring.

The stirring speed may be a speed conventionally used for preparing the vinyl chloride-based polymer, and may be controlled depending on the physical properties of the desired vinyl chloride-based polymer. Accordingly, the speed is not particularly limited, but for example, the initial stirring speed may be more than 180 rpm to less than 220 rpm, preferably 190-210 rpm, more preferably 195-205 rpm.

Furthermore, a method for preparing a vinyl chloride-based polymer according to an embodiment of the present invention may further include separating and recovering the unreacted monomer and the product, respectively after termination of the polymerization.

At the appropriate time, the suspension polymerization may be terminated by adding a reaction terminator, and the termination time may be a point at which the pressure in the reactor is 6-8 kgf/cm$^2$ (or a point at which the polymerization conversion rate exceeds 85%).

The reaction terminator is not particularly limited, but may be, for example, a phenol compound, an amine compound, a nitrile compound, a sulfur compound, or the like. Specifically, the reaction terminator may be one or more selected among a phenol compound such as triethylene glycol-bis-3-(3-t-butyl-4-hydroxy-5-methylphenyl)propionate, hydroquinone, p-methoxyphenol, t-butylhydroxyanisole, n-octadecyl-3-(4-hydroxy-3,5-di-t-butylphenyl)propionate, 2,5-di-t-butylhydroquinone, 4, 4'-butylidenebis(3-methyl-6-t-butyl)phenol, t-butyl catechol, 4,4'-thiobis(6-t-butyl-m-cresol), and tocopherol; an amine compound such as N,N'-diphenyl-p-phenylenediamine and 4,4'-bis(dimethylbenzyl)diphenyl amine; a nitrile compound such as 2-phenyl nitronylnitroxide, 3-imidazoline nitroxide, and 4-hydroxy-2,2', 6,6'-tetramethyl-piperidine-1-oxyl; a sulfur compound such as dodecyl mercaptan and 1,2-diphenyl-2-thiol; and a phosphorus compound such as triphenyl phosphite, diphenyldecyl phosphite, phenylisodecylphosphite, tri(nonylphenyl) phosphite, and trilauryl trithiophosphite, and preferably, triethylene glycol-bis-3-(3-t-butyl-4-hydroxy-5-methylphenyl)propionate, 4-hydroxy-2,2',6,6'-tetramethyl-piperidine-1-oxyl, or a mixture thereof may be included.

The vinyl chloride-based polymer prepared according the termination of the polymerization may be in a slurry form, and the slurry may be prepared in a form of the final vinyl chloride-based polymer by removing moisture with a fluidized bed dryer under conventional reaction conditions.

Furthermore, in the suspension polymerization, additives such as a polymerization regulator, a chain transfer agent, a pH adjuster, an antioxidant, a crosslinking agent, an antistatic agent, a scale inhibitor, and a surfactant may further be added as necessary in addition to the above-described effective components. The kind and content of the additives are not particularly limited and the additives may be used in the conventional kind and content known in the art. The additives may be added at any time of in the beginning of the suspension polymerization, during the suspension polymerization, or after the suspension polymerization, and may be added together at once or may be continuously added.

As a reactor used in the present invention, a shape of a stirrer and a baffle, etc. in a stirring device is not particularly limited, and any stirring device generally used in the suspension polymerization of the vinyl chloride-based polymer may be used. The suspension polymerization may be performed through a batch process, but the process is not limited thereto. As specific examples of stirring blades in the stirrer, a paddle type, a pitched paddle type, a bloomers gin type, a power feeder type, a turbine type, a propeller type, and the like may be used alone or in a combination of two or more thereof, and as examples of the baffles, a plate type, a cylindrical type, a D type, a loop type, a finger type, and the like may be used.

Furthermore, the present invention provides a vinyl chloride-based polymer having an excellent apparent specific gravity, wherein the vinyl chloride-based polymer may be prepared by the above-described preparing method. Conventionally, vinyl chloride-based polymers having various grades may be prepared by controlling the preparation conditions in order to have the optimal physical properties, depending on the application. According to an embodiment of the present invention, there is an effect of preparing a vinyl chloride-based polymer having an improved apparent specific gravity compared with conventional vinyl chloride-based polymers in the same grade by controlling the surface tension of the polymerization mixture in the preparing conditions to 46.5 mN/m or more. In the description, the grade of the vinyl chloride-based polymer may mean that the vinyl chloride-based polymer is classified according to criterion such as purpose, physical properties, hardness, or softness, and the intended purposes are different according to the grades of the vinyl chloride-based polymer, so that the intended physical properties and compounding properties, such as an apparent specific gravity, may vary.

In addition, the vinyl chloride-based polymer according to an embodiment of the present invention may be a vinyl chloride-based polymer prepared according to the above-described preparing method, wherein the vinyl chloride-based polymer may have an apparent specific gravity of 0.4-0.7, preferably 0.45-0.65.

In addition, the vinyl chloride-based polymer according to an embodiment of the present invention may mean that only vinyl chloride monomers are polymerized, or a mixture of a vinyl chloride monomer and a vinyl-based monomer copolymerizable with a vinyl chloride monomer is polymerized. For example, the vinyl chloride polymer according to an embodiment of the present invention may be a vinyl chloride homopolymer or a copolymer of a vinyl chloride monomer and a vinyl-based monomer copolymerizable therewith. When the vinyl chloride-based polymer is the above-described copolymer, 50% or more of vinyl chloride may be contained.

The vinyl-based monomer copolymerizable with the vinyl chloride monomer is not particularly limited, but may be, for example: an olefin compound such as ethylene, propylene, and butene; vinyl esters such as vinyl acetate, vinyl propionate, and vinyl stearate; unsaturated nitriles such as acrylonitrile; vinyl alkyl ethers such as vinyl methyl ether, vinyl ethyl ether, vinyl octyl ether, and vinyl lauryl ether; vinylidene halides such as vinylidene chloride;

unsaturated fatty acids and anhydrides thereof such as acrylic acid, methacrylic acid, itaconic acid, maleic acid, fumaric acid, maleic anhydride, and itaconic anhydride; unsaturated fatty acid esters such as methyl acrylate, ethyl acrylate, monomethyl maleate, dimethyl maleate, and butylbenzyl maleate; and a crosslinkable monomer such as diallyl phthalate, and the vinyl monomers may be used alone or in combination of two or more thereof.

Furthermore, according to an embodiment of the present invention, a vinyl chloride resin composition including the vinyl chloride-based polymer is provided, wherein the vinyl chloride resin composition may optionally further include, in addition to the vinyl chloride-based polymer, additives which can be conventionally added such as a stabilizer, a lubricant, a processing aid, a filler, or the like. The vinyl chloride resin composition according to the present invention has an effect of improving an extrusion amount during extrusion, thereby improving processing productivity.

Hereinafter, Examples of the present invention will be described in detail in such a manner that it may easily be carried out by a person with ordinary skill in the art to which the present invention pertains. The invention may, however, be embodied in many different forms and should not be construed as being limited to the examples set forth herein.

EXAMPLES

Grades A, B, C, and D described in the examples and comparative examples of the present invention are used as terms for distinguishing vinyl chloride-based polymers depending on preparing conditions such as a polymerization temperature, addition proportions and addition amounts of a polyvinyl alcohol and a cellulose-based material which are used as protective colloid auxiliary agents, and the like, but the present invention is not limited to these grades.

Example 1

390 kg of deionized water was added to a reactor which has a reflux condenser and an internal volume of 1 m³, and then 48 g of a polyvinyl alcohol having a hydrolysis degree of 88% and a surface tension of a 0.2% aqueous solution at 25° C. of 48.5 mN/m, 100 g of a polyvinyl alcohol having a hydrolysis degree of 72% and a surface tension of a 0.2% aqueous solution at 25° C. of 42.7 mN/m, 60 g of a polyvinyl alcohol having a hydrolysis degree of 55% and a surface tension of a 0.2% aqueous solution at 25° C. of 42.9 mN/m, and 24 g of hydroxypropylmethyl cellulose were added together to the reactor at once to form a polymerization mixture solution having a surface tension of 47.2 mN/m. Here, the surface tension is a value obtained by measuring the surface tension of a 0.2% aqueous solution using a Du-Nouy surface tension meter under the conditions of 25° C. and 1 atm. Thereafter, 300 kg of a vinyl chloride monomer was added, and g of di-2-ethylhexylperoxydicarbonate and 120 g of t-butylperoxy neodecanonate were added, and then the polymerization reaction was performed while maintaining the reaction temperature at 64° C. When the polymerization reactor pressure reached to 6.3 kgf/cm$^2$, 15 g of 4-hydroxy-2,2,6,6-tetramethyl-piperidine-1-oxyl and 60 g of triethylene glycol-bis-3-(3-t-butyl-4-hydroxy-5-methylphenyl)propionate were added as reaction terminators, and then unreacted monomers were recovered. In addition, the moisture content of the resin slurry was minimized through a stripping process and a dehydration process. The slurry obtained from this way, was dried in a fluidized bed dryer at a temperature of 60° C. to obtain a vinyl chloride polymer (grade A).

Example 2

A vinyl chloride polymer (grade A) was obtained in the same manner as in Example 1 except that 48 g of a polyvinyl alcohol having a hydrolysis degree of 88% and a surface tension of a 0.2% aqueous solution at 25° C. of 48.6 mN/m, 100 g of a polyvinyl alcohol having a hydrolysis degree of 72% and a surface tension of a 0.2% aqueous solution at 25° C. of 43.0 mN/m, 60 g of a polyvinyl alcohol having a hydrolysis degree of 55% and a surface tension of a 0.2% aqueous solution at 25° C. of 43.2 mN/m, and 24 g of hydroxypropylmethyl cellulose were added together to the reactor at once to form a polymerization mixture solution having a surface tension of 47.5 mN/m.

Example 3

A vinyl chloride polymer (grade B) was obtained in the same manner as in Example 1 except that 56 g of a polyvinyl alcohol having a hydrolysis degree of 88% and a surface tension of a 0.2% aqueous solution at 25° C. of 48.5 mN/m, 94 g of a polyvinyl alcohol having a hydrolysis degree of 72% and a surface tension of a 0.2% aqueous solution at 25° C. of 42.7 mN/m, 66 g of a polyvinyl alcohol having a hydrolysis degree of 55% and a surface tension of a 0.2% aqueous solution at 25° C. of 42.9 mN/m, and 16 g of hydroxypropylmethyl cellulose were added together to the reactor at once to form a polymerization mixture solution having a surface tension of 46.7 mN/m.

Example 4

A vinyl chloride polymer (grade B) was obtained in the same manner as in Example 1 except that 56 g of a polyvinyl alcohol having a hydrolysis degree of 88% and a surface tension of a 0.2% aqueous solution at 25° C. of 48.6 mN/m, 94 g of a polyvinyl alcohol having a hydrolysis degree of 72% and a surface tension of a 0.2% aqueous solution at 25° C. of 43.0 mN/m, 66 g of a polyvinyl alcohol having a hydrolysis degree of 55% and a surface tension of a 0.2% aqueous solution at 25° C. of 43.2 mN/m, and 16 g of hydroxypropylmethyl cellulose were added together to the reactor at once to form a polymerization mixture solution having a surface tension of 47.1 mN/m.

Example 5

A vinyl chloride polymer (grade C) was obtained in the same manner as in Example 1 except that 94 g of a polyvinyl alcohol having a hydrolysis degree of 88% and a surface tension of a 0.2% aqueous solution at 25° C. of 48.5 mN/m, 102 g of a polyvinyl alcohol having a hydrolysis degree of 72% and a surface tension of a 0.2% aqueous solution at 25° C. of 42.7 mN/m, 78 g of a polyvinyl alcohol having a hydrolysis degree of 55% and a surface tension of a 0.2% aqueous solution at 25° C. of 42.9 mN/m, and 38 g of hydroxypropylmethyl cellulose were added together to the reactor at once to form a polymerization mixture solution having a surface tension of 46.9 mN/m, and the polymerization reaction was performed while maintaining the reaction temperature at 58° C.

Example 6

A vinyl chloride polymer (grade C) was obtained in the same manner as in Example 1 except that 94 g of a polyvinyl alcohol having a hydrolysis degree of 88% and a surface tension of a 0.2% aqueous solution at 25° C. of 48.6 mN/m, 102 g of a polyvinyl alcohol having a hydrolysis degree of 72% and a surface tension of a 0.2% aqueous solution at 25° C. of 43.0 mN/m, 78 g of a polyvinyl alcohol having a hydrolysis degree of 55% and a surface tension of a 0.2% aqueous solution at 25° C. of 43.2 mN/m, and 38 g of hydroxypropylmethyl cellulose were added together to the reactor at once to form a polymerization mixture solution having a surface tension of 47.2 mN/m, and the polymerization reaction was performed while maintaining the reaction temperature at 58° C.

Example 7

A vinyl chloride polymer (grade D) was obtained in the same manner as in Example 1 except that 170 g of a polyvinyl alcohol having a hydrolysis degree of 88% and a surface tension of a 0.2% aqueous solution at 25° C. of 48.5 mN/m, 85 g of a polyvinyl alcohol having a hydrolysis degree of 72% and a surface tension of a 0.2% aqueous solution at 25° C. of 42.7 mN/m, 23 g of a polyvinyl alcohol having a hydrolysis degree of 55% and a surface tension of a 0.2% aqueous solution at 25° C. of 42.9 mN/m, and 34 g of hydroxypropylmethyl cellulose were added together to the reactor at once to form a polymerization mixture solution having a surface tension of 47.5 mN/m, and the polymerization reaction was performed while maintaining the reaction temperature at 58° C.

Example 8

A vinyl chloride polymer (grade D) was obtained in the same manner as in Example 1 except that 170 g of a polyvinyl alcohol having a hydrolysis degree of 88% and a surface tension of a 0.2% aqueous solution at 25° C. of 48.6 mN/m, 85 g of a polyvinyl alcohol having a hydrolysis degree of 72% and a surface tension of a 0.2% aqueous solution at 25° C. of 43.0 mN/m, 23 g of a polyvinyl alcohol having a hydrolysis degree of 55% and a surface tension of a 0.2% aqueous solution at 25° C. of 43.2 mN/m, and 34 g of hydroxypropylmethyl cellulose were added together to the reactor at once to form a polymerization mixture solution having a surface tension of 47.9 mN/m, and the polymerization reaction was performed while maintaining the reaction temperature at 58° C.

Comparative Example 1

A vinyl chloride polymer (grade A) was obtained in the same manner as in Example 1 except that 48 g of a polyvinyl alcohol having a hydrolysis degree of 88% and a surface tension of a 0.2% aqueous solution at 25° C. of 48.0 mN/m, 100 g of a polyvinyl alcohol having a hydrolysis degree of 72% and a surface tension of a 0.2% aqueous solution at 25° C. of 41.7 mN/m, 60 g of a polyvinyl alcohol having a hydrolysis degree of 55% and a surface tension of a 0.2% aqueous solution at 25° C. of 42.1 mN/m, and 24 g of hydroxypropylmethyl cellulose were added together to the reactor at once to form a polymerization mixture solution having a surface tension of 46.0 mN/m.

Comparative Example 2

A vinyl chloride polymer (grade B) was obtained in the same manner as in Example 1 except that 56 g of a polyvinyl alcohol having a hydrolysis degree of 88% and a surface tension of a 0.2% aqueous solution at 25° C. of 48.0 mN/m, 94 g of a polyvinyl alcohol having a hydrolysis degree of 72% and a surface tension of a 0.2% aqueous solution at 25° C. of 41.7 mN/m, 66 g of a polyvinyl alcohol having a hydrolysis degree of 55% and a surface tension of a 0.2% aqueous solution at 25° C. of 42.1 mN/m, and 16 g of hydroxypropylmethyl cellulose were added together to the reactor at once to form a polymerization mixture solution having a surface tension of 45.3 mN/m.

Comparative Example 3

A vinyl chloride polymer (grade C) was obtained in the same manner as in Example 1 except that 94 g of a polyvinyl alcohol having a hydrolysis degree of 88% and a surface tension of a 0.2% aqueous solution at 25° C. of 48.0 mN/m, 102 g of a polyvinyl alcohol having a hydrolysis degree of 72% and a surface tension of a 0.2% aqueous solution at 25° C. of 41.7 mN/m, 78 g of a polyvinyl alcohol having a hydrolysis degree of 55% and a surface tension of a 0.2% aqueous solution at 25° C. of 42.1 mN/m, and 38 g of hydroxypropylmethyl cellulose were added together to the reactor at once to form a polymerization mixture solution having a surface tension of 45.9 mN/m, and the polymerization reaction was performed while maintaining the reaction temperature at 58° C.

Comparative Example 4

A vinyl chloride polymer (grade D) was obtained in the same manner as in Example 1 except that 170 g of a polyvinyl alcohol having a hydrolysis degree of 88% and a surface tension of a 0.2% aqueous solution at 25° C. of 48.0 mN/m, 85 g of a polyvinyl alcohol having a hydrolysis degree of 72% and a surface tension of a 0.2% aqueous solution at 25° C. of 41.7 mN/m, 23 g of a polyvinyl alcohol having a hydrolysis degree of 55% and a surface tension of a 0.2% aqueous solution at 25° C. of 42.1 mN/m, and 34 g of hydroxypropylmethyl cellulose were added together to the reactor at once to form a polymerization mixture solution having a surface tension of 46.2 mN/m, and the polymerization reaction was performed while maintaining the reaction temperature at 58° C.

Experimental Example 1

Grade A Vinyl Chloride Polymer

1) Measurement of Apparent Specific Gravity of Vinyl Chloride Polymer

The apparent specific gravity of the vinyl chloride polymer prepared in Example 1, Example 2, and Comparative Example 1 was measured according to ASTM D1 895-95, and the result is represented in Table 1 below.

2) Measurement of Extrusion Amount of Vinyl Chloride Resin Composition 5 parts by weight of a stabilizer, 0.5 parts by weight of a lubricant, 5 parts by weight of a processing aid, and 15 parts by weight of a filler were supplied to a Twin extruder at 180° C. in addition to 100 parts by weight of the vinyl chloride polymer prepared in Example 1, Example 2, and Comparative Example 1, and then the extrusion amount of the extrudate extruded at 7 rpm was measured by gram per minute (g/min), and the result is represented in Table 1 below.

TABLE 1

|  | Example 1 | Example 2 | Comparative Example 1 |
| --- | --- | --- | --- |
| apparent specific gravity | 0.577 | 0.584 | 0.565 |
| extrusion amount (g/min) | 84.8 | 85.1 | 81.5 |

As shown in Table 1, it is confirmed that Examples 1 and 2, in which the surface tensions of the polymerization mixtures are 46.5 mN/m or more, have the high apparent specific gravity and an excellent extrusion amount during extrusion compared with Comparative Example 1, in which the surface tension is less than 46.5 mN/m, although the preparation conditions are all the same except for the surface tension of the polymerization mixture.

Experimental Example 2

Grade B Vinyl Chloride Polymer

1) Measurement of Apparent Specific Gravity of Vinyl Chloride Polymer

The apparent specific gravity of the vinyl chloride polymer prepared in Example 3, Example 4, and Comparative Example 2 was measured according to ASTM D1 895-95, and the result is represented in Table 2 below.

2) Measurement of Extrusion Amount of Vinyl Chloride Resin Composition 5 parts by weight of a stabilizer, 0.5 parts by weight of a lubricant, 5 parts by weight of a processing aid, and 15 parts by weight of a filler were supplied to a Twin extruder at 180° C. in addition to 100 parts by weight of the vinyl chloride polymer prepared in Example 3, Example 4, and Comparative Example 2, and then the extrusion amount of the extrudate extruded at 7 rpm was measured by gram per minute (g/min), and the result is represented in Table 2 below.

TABLE 2

|  | Example 3 | Example 4 | Comparative Example 2 |
|---|---|---|---|
| apparent specific gravity | 0.592 | 0.599 | 0.584 |
| extrusion amount (g/min) | 85.4 | 85.7 | 82.7 |

As shown in Table 2, it is confirmed that Examples 3 and 4, in which the surface tensions of the polymerization mixtures are 46.5 mN/m or more, have the high apparent specific gravity and an excellent extrusion amount during extrusion compared with Comparative Example 2, in which the surface tension is less than 46.5 mN/m, although the preparation conditions are all the same except for the surface tension of the polymerization mixture.

Experimental Example 3

Grade C Vinyl Chloride Polymer

1) Measurement of Apparent Specific Gravity of Vinyl Chloride Polymer

The apparent specific gravity of the vinyl chloride polymer prepared in Example 5, Example 6, and Comparative Example 3 was measured according to ASTM D1 895-95, and the result is represented in Table 3 below.

2) Measurement of Extrusion Amount of Vinyl Chloride Resin Composition 6 parts by weight of a stabilizer, 1 parts by weight of a lubricant, 3 parts by weight of a processing aid, and 10 parts by weight of a filler were supplied to a Twin extruder at 185° C. in addition to 100 parts by weight of the vinyl chloride polymer prepared in Example 5, Example 6, and Comparative Example 3, and then the extrusion amount of the extrudate extruded at 7 rpm was measured by gram per minute (g/min), and the result is represented in Table 3 below.

TABLE 3

|  | Example 5 | Example 6 | Comparative Example 3 |
|---|---|---|---|
| apparent specific gravity | 0.558 | 0.567 | 0.543 |
| extrusion amount (g/min) | 56.2 | 57.1 | 54.6 |

As shown in Table 3, it is confirmed that Examples 5 and 6, in which the surface tensions of the polymerization mixtures are 46.5 mN/m or more, have high apparent specific gravity and an excellent extrusion amount during extrusion compared with Comparative Example 3, in which the surface tension is less than 46.5 mN/m, although the preparation conditions are all the same except for the surface tension of the polymerization mixture.

Experimental Example 4

Grade D Vinyl Chloride Polymer

1) Measurement of Apparent Specific Gravity of Vinyl Chloride Polymer

The apparent specific gravity of the vinyl chloride polymer prepared in Example 7, Example 8, and Comparative Example 4 was measured according to ASTM D1 895-95, and the result is represented in Table 4 below.

2) Measurement of Extrusion Amount of Vinyl Chloride Resin Composition 6 parts by weight of a stabilizer, 1 parts by weight of a lubricant, 3 parts by weight of a processing aid, and 10 parts by weight of a filler were supplied to a Twin extruder at 185° C. in addition to 100 parts by weight of the vinyl chloride polymer prepared in Example 7, Example 8, and Comparative Example 4, and then the extrusion amount of the extrudate extruded at 7 rpm was measured by gram per minute (g/min), and the result is represented in Table 4 below.

TABLE 4

|  | Example 7 | Example 8 | Comparative Example 4 |
|---|---|---|---|
| apparent specific gravity | 0.581 | 0.589 | 0.568 |
| extrusion amount (g/min) | 57.9 | 58.6 | 55.1 |

As shown in Table 4, it is confirmed that Examples 7 and 8, in which the surface tensions of the polymerization mixtures are 46.5 mN/m or more, have high apparent specific gravity and an excellent extrusion amount during extrusion compared with Comparative Example 4, in which the surface tension is less than 46.5 mN/m, although the preparation conditions are all the same except for the surface tension of the polymerization mixture.

In this way, according to an embodiment of the present invention, when the polymerization is prepared such that the surface tension of the polymerization mixture is controlled to 46.5 mN/m or more, and then the vinyl chloride-based monomer is added, a vinyl chloride-based polymer having an excellent apparent specific gravity and extrusion amount per unit time, compared with the conventional vinyl chloride-based polymer prepared under the same conditions except for the surface tension of the polymerization mixture can be prepared, thereby having an effect of obtaining a vinyl chloride-based polymer of which processing productivity is improved.

The invention claimed is:

1. A method for preparing a vinyl chloride-based polymer, the method comprising:
    preparing a polymerization mixture comprising polymerization water, a polymerization initiator, and a protective colloid auxiliary agent,
    the polymerization mixture having a surface tension of 46.5 mN/m or more; and
    suspension polymerizing a vinyl chloride-based monomer in the presence of the polymerization mixture to prepare a vinyl chloride-based polymer.

2. The method of claim 1, wherein the polymerization mixture has a surface tension of 46.5-50 mN/m.

3. The method of claim 1, wherein the protective colloid auxiliary agent comprises a vinyl alcohol-based resin and a cellulose-based material.

4. The method of claim 3, wherein the vinyl alcohol-based resin comprises a mixture of two or more vinyl alcohol-based resins having different surface tensions.

5. The method of claim 3, wherein the vinyl alcohol-based resin comprises a vinyl alcohol-based resin having a surface tension of more than 48 mN/m and a vinyl alcohol-based resin having a surface tension of 42-48 mN/m.

6. The method of claim 3, wherein the vinyl alcohol-based resin comprises a mixture of two or more of: a vinyl alcohol-based resin having a hydrolysis degree of more than 75% to 98% or less and a surface tension of more than 48 mN/m; a vinyl alcohol-based resin having a hydrolysis degree of more than 60% to 75% or less, and a surface tension of 42-48 mN/m; and a vinyl alcohol-based resin having a hydrolysis degree of 30-60% and a surface tension of 42-48 mN/m.

7. The method of claim 3, wherein the vinyl alcohol-based resin, with respect to 100 parts by weight of the vinyl chloride-based monomer, comprises a mixture of two or more of: 0.01-0.1 parts by weight of a vinyl alcohol-based resin having a hydrolysis degree of more than 75% to 98% or less, and a surface tension of more than 48 mN/m; 0.01-0.06 parts by weight of a vinyl alcohol-based resin having a hydrolysis degree of more than 60% to 75% or less, and a surface tension of 42-48 mN/m; and 0.005-0.05 parts by weight of a vinyl alcohol-based resin having a hydrolysis degree of 30-60% and a surface tension of 42-48 mN/m.

8. The method of claim 3, wherein the cellulose-based material is included in an amount of 0.001-0.5 parts by weight, with respect to 100 parts by weight of the vinyl chloride-based monomer, and comprises one or more cellulose selected from the group consisting of methylcellulose, hydroxyethylcellulose, and hydroxypropylmethylcellulose.

9. The method of claim 1, wherein the suspension polymerization is performed at a temperature of 50-70° C.

* * * * *